(12) United States Patent
Dawe et al.

(10) Patent No.: US 8,474,214 B2
(45) Date of Patent: Jul. 2, 2013

(54) CONNECTING STRUCTURE FOR AUTOMOTIVE TRIM PANELS

(75) Inventors: Douglas Dawe, Milford, MI (US); Nicholas Spitler, New Hudson, MI (US)

(73) Assignee: Nissan North America, Inc., Franklin, TN (US)

( * ) Notice: Subject to any disclaimer, the term of this patent is extended or adjusted under 35 U.S.C. 154(b) by 129 days.

(21) Appl. No.: 13/014,458

(22) Filed: Jan. 26, 2011

(65) Prior Publication Data

US 2012/0187722 A1      Jul. 26, 2012

(51) Int. Cl.
*B62D 27/00*   (2006.01)
*F16B 2/20*    (2006.01)

(52) U.S. Cl.
USPC ..... 52/716.6; 52/716.5; 52/716.8; 52/792.11; 24/289; 296/1.08; 296/24.34; 296/70; 296/191

(58) Field of Classification Search
USPC ........ 52/716.8, 716.5, 716.6, 717.01, 718.01, 52/718.04, 208, 511, 582.2, 834, 844, 845, 52/785.12, 786.12, 787.12, 792.1, 792.11; 296/191, 146.6, 204, 202, 205, 39.1, 39.3, 296/1.08, 24.34, 70, 37.8; 24/289, 293, 294
See application file for complete search history.

(56) References Cited

U.S. PATENT DOCUMENTS

| | | | |
|---|---|---|---|
| 2,244,649 A | | 6/1941 | Carpenter et al. |
| 2,598,776 A | * | 6/1952 | Flora .............................. 24/295 |
| 3,778,958 A | | 12/1973 | Fowler |
| 4,328,649 A | * | 5/1982 | Sieve ............................... 52/202 |
| 4,480,360 A | * | 11/1984 | Brugman et al. ............... 24/295 |
| 4,593,441 A | * | 6/1986 | St. Louis ......................... 24/297 |
| 4,871,329 A | * | 10/1989 | Van Der Meer .............. 439/594 |
| 5,288,530 A | * | 2/1994 | Maki ............................... 428/31 |
| 5,347,691 A | * | 9/1994 | Terazoe .......................... 24/295 |
| 5,353,571 A | * | 10/1994 | Berdan et al. ................ 52/716.5 |
| 5,417,020 A | | 5/1995 | Dobija |
| 5,433,498 A | * | 7/1995 | Ishiwata ....................... 296/39.1 |
| 5,501,052 A | * | 3/1996 | Saji ............................... 52/716.5 |
| 5,510,957 A | * | 4/1996 | Takagi .......................... 361/814 |
| 5,610,376 A | * | 3/1997 | Takagi et al. .............. 200/50.01 |
| 5,639,140 A | * | 6/1997 | Labrash ....................... 296/39.1 |
| 5,644,884 A | * | 7/1997 | Dobija ........................ 52/506.01 |
| 5,788,532 A | * | 8/1998 | Takiguchi et al. ............ 439/374 |
| 5,846,017 A | * | 12/1998 | Meyer ........................... 403/397 |
| 5,873,749 A | * | 2/1999 | Takiguchi et al. ............ 439/534 |
| 6,135,517 A | * | 10/2000 | Cordebar ...................... 293/155 |
| 6,179,359 B1 | * | 1/2001 | Clauson et al. ............. 296/39.1 |

(Continued)

FOREIGN PATENT DOCUMENTS

GB           2260794           4/1993

*Primary Examiner* — Basil Katcheves
*Assistant Examiner* — Rodney Mintz
(74) *Attorney, Agent, or Firm* — Young, Basile, Hanlon & MacFarlane, P.C.

(57) ABSTRACT

A connecting structure includes a first connecting part and a second connecting part. The first connecting part has a clip and a stabilizer flange that is spaced apart from the clip. The second connecting part has a first engagement structure that is engageable with the clip of the first connecting part to restrain movement of the second connecting part with respect to the first connecting part in an insertion direction. The second connecting part also has a second engagement structure that is engageable with the stabilizer flange of the first connecting part to restrain movement of the second connecting part with respect to the first connecting part in an elevational direction.

18 Claims, 4 Drawing Sheets

U.S. PATENT DOCUMENTS

| | | | |
|---|---|---|---|
| 6,193,538 B1* | 2/2001 | Amari et al. | 439/297 |
| 6,226,947 B1* | 5/2001 | Bado et al. | 52/483.1 |
| 6,308,488 B1* | 10/2001 | Hoshino | 52/716.5 |
| 6,564,433 B2* | 5/2003 | Nagasawa | 24/297 |
| 6,666,413 B2* | 12/2003 | Nakajima | 248/27.1 |
| 6,672,027 B2* | 1/2004 | Mizutani et al. | 52/716.5 |
| 6,715,764 B2* | 4/2004 | Delavalle et al. | 276/29 |
| 6,722,730 B2* | 4/2004 | Lydan et al. | 296/191 |
| 6,824,201 B2* | 11/2004 | Miyazaki | 296/193.06 |
| 6,971,701 B2* | 12/2005 | Doll et al. | 296/72 |
| 6,971,708 B2* | 12/2005 | Iiya | 296/191 |
| 7,063,369 B2* | 6/2006 | Cowelchuk et al. | 296/70 |
| 7,104,590 B2* | 9/2006 | Dooley et al. | 296/153 |
| 7,144,059 B2* | 12/2006 | Pfister et al. | 296/29 |
| 7,270,363 B1* | 9/2007 | Hanson et al. | 296/70 |
| 7,503,608 B1* | 3/2009 | Shahidehpour | 296/29 |
| 7,597,377 B2* | 10/2009 | Sutou et al. | 296/70 |
| 7,644,975 B2* | 1/2010 | Ryan et al. | 296/136.01 |
| 7,753,423 B2* | 7/2010 | Zellner, Jr. | 296/1.08 |
| 7,766,370 B2 | 8/2010 | Putcha | |
| 7,802,831 B2* | 9/2010 | Isayama et al. | 296/24.34 |
| 7,815,237 B2* | 10/2010 | Robertson | 296/70 |
| 7,883,140 B2* | 2/2011 | Wurfel et al. | 296/191 |
| 8,020,905 B2* | 9/2011 | Nakayama | 293/115 |
| 8,056,951 B2* | 11/2011 | Schilles | 296/37.13 |
| 8,118,337 B2* | 2/2012 | Nakayama | 293/115 |
| 8,240,098 B2* | 8/2012 | Insa | 52/459 |
| 8,276,961 B2* | 10/2012 | Kwolek | 296/1.08 |
| 8,327,600 B2* | 12/2012 | Stepan | 52/716.6 |
| 8,388,039 B2* | 3/2013 | Gerndorf et al. | 296/1.08 |
| 8,414,048 B1* | 4/2013 | Kwolek | 296/24.34 |
| 2001/0052210 A1* | 12/2001 | Mizutani et al. | 52/208 |
| 2002/0130529 A1* | 9/2002 | Takano | 296/70 |
| 2002/0158484 A1* | 10/2002 | Delavalle et al. | 296/29 |
| 2004/0135383 A1* | 7/2004 | Ariga et al. | 293/117 |
| 2004/0183330 A1* | 9/2004 | Ruegenberg et al. | 296/70 |
| 2005/0200152 A1* | 9/2005 | Cowelchuk et al. | 296/70 |
| 2005/0242603 A1* | 11/2005 | Holderle et al. | 296/1.08 |
| 2006/0214462 A1* | 9/2006 | Cowelchuk et al. | 296/70 |
| 2007/0085361 A1* | 4/2007 | Hauser | 296/1.08 |
| 2007/0175164 A1* | 8/2007 | Beck | 52/716.5 |
| 2007/0204660 A1* | 9/2007 | Nakayama | 70/208 |
| 2007/0210603 A1* | 9/2007 | Hanson et al. | 296/70 |
| 2008/0001422 A1* | 1/2008 | Kwolek | 296/24.34 |
| 2008/0169667 A1* | 7/2008 | Siniarski et al. | 296/37.8 |
| 2008/0238049 A1* | 10/2008 | Putcha | 280/728.3 |
| 2009/0031652 A1* | 2/2009 | Ortega Gatalan | 52/235 |
| 2009/0174201 A1* | 7/2009 | Nakayama | 293/155 |
| 2009/0230589 A1* | 9/2009 | Rossi et al. | 264/292 |
| 2009/0261619 A1* | 10/2009 | Wurfel et al. | 296/180.1 |
| 2009/0289470 A1* | 11/2009 | Dix et al. | 296/146.6 |
| 2010/0072767 A1* | 3/2010 | D'Alessandro | 296/24.34 |
| 2010/0123329 A1* | 5/2010 | Galicia et al. | 296/39.1 |
| 2010/0219653 A1* | 9/2010 | Kwolek | 296/72 |
| 2010/0237644 A1* | 9/2010 | Senge | 296/1.08 |
| 2011/0127804 A1* | 6/2011 | Moenter et al. | 296/214 |
| 2011/0138716 A1* | 6/2011 | Schulte et al. | 52/208 |
| 2012/0175891 A1* | 7/2012 | Buchheit | 292/42 |
| 2012/0187707 A1* | 7/2012 | Kwolek | 296/1.08 |
| 2012/0193933 A1* | 8/2012 | Spitler | 296/74 |
| 2012/0299324 A1* | 11/2012 | Langenbacher et al. | 296/37.13 |
| 2013/0031865 A1* | 2/2013 | Besedich et al. | 52/716.7 |
| 2013/0099518 A1* | 4/2013 | Kwolek | 296/1.08 |

* cited by examiner

CONNECTING STRUCTURE FOR AUTOMOTIVE TRIM PANELS

TECHNICAL FIELD

The disclosure relates to the field of interior trim panels for automobiles and, more particularly, to a connecting structure for interior trim panels in automobiles.

BACKGROUND

Interior trim panel design for motor vehicles requires consideration of numerous competing priorities. An area of particular concern is the center stack, which is a portion of the instrument panel of the vehicle that is located between the driver seat and the front passenger seat of the vehicle. The center stack typically houses audio controls, climate controls, and other vehicle controls. Since the center stack is so prominently situated within most vehicles, aesthetic considerations are especially important. Additionally, due to the complexity of the center stack, it can be difficult to suitably mesh practical design considerations with the aesthetic vision for a particular vehicle design.

At junctions between two or more interior trim panels, connecting structures are typically provided to connect the trim panels to one another and/or an underlying structure. These connecting structures provide resistance to detachment to allow the panels to remain firmly secured to one another, especially if the vehicle becomes involved in a collision. Such connecting structures are often designed to allow for easy assembly and to minimize the visibility of fasteners.

Fasteners for connecting adjacent trim panels can require a relatively large area at the rear of the panels, where the fasteners are typically located. Consequently, areas taken up by fasteners and other connecting structures cannot be utilized to accommodate the various controls, displays, and HVAC openings that are typically found in the center stack area of the vehicle, thereby reducing the usable space in the center stack area, and creating a margin between panels within which these features cannot be accommodated.

For both functional and aesthetic reasons, need remains for connecting structures that are capable of joining adjacent trim panels and that occupy reduced surface area on such trim panels.

SUMMARY

Connecting structures for automotive trim panels and interior trim panel assemblies for automobiles are taught herein.

A connecting structure taught herein includes a first connecting part and a second connecting part. The first connecting part has a clip and a stabilizer flange that is spaced apart from the clip. The second connecting part has a first engagement structure and a second engagement structure.

The first engagement structure of the second connecting part is engageable with the clip of the first connecting part to restrain movement of the second connecting part with respect to the first connecting part in an insertion direction. The second engagement structure of the second connecting part is engageable with the stabilizer flange of the first connecting part to restrain movement of the second connecting part with respect to the first connecting part in an elevational direction.

An interior trim panel assembly for an automobile taught herein includes a first panel, a first connecting part, a second panel, and a second connecting part.

The first panel has a first edge. The first connecting part is positioned adjacent to the first edge of the first panel. The first connecting part has a clip and a stabilizer flange that is spaced apart from the clip.

The second panel has a second edge. The second connecting part is positioned adjacent to the second edge of the second panel.

The second connecting part has a first engagement structure that is engageable with the clip of the first connecting part to restrain movement of the second panel with respect to the first panel in an insertion direction. The second connecting part has a second engagement structure that is engageable with the stabilizer flange of the first connecting part to restrain movement of the second panel with respect to the first panel in an elevational direction.

BRIEF DESCRIPTION OF THE DRAWINGS

The description herein makes reference to the accompanying drawings wherein like reference numerals refer to like parts throughout the several views, and wherein.

DETAILED DESCRIPTION OF THE EMBODIMENT

Figure 1:
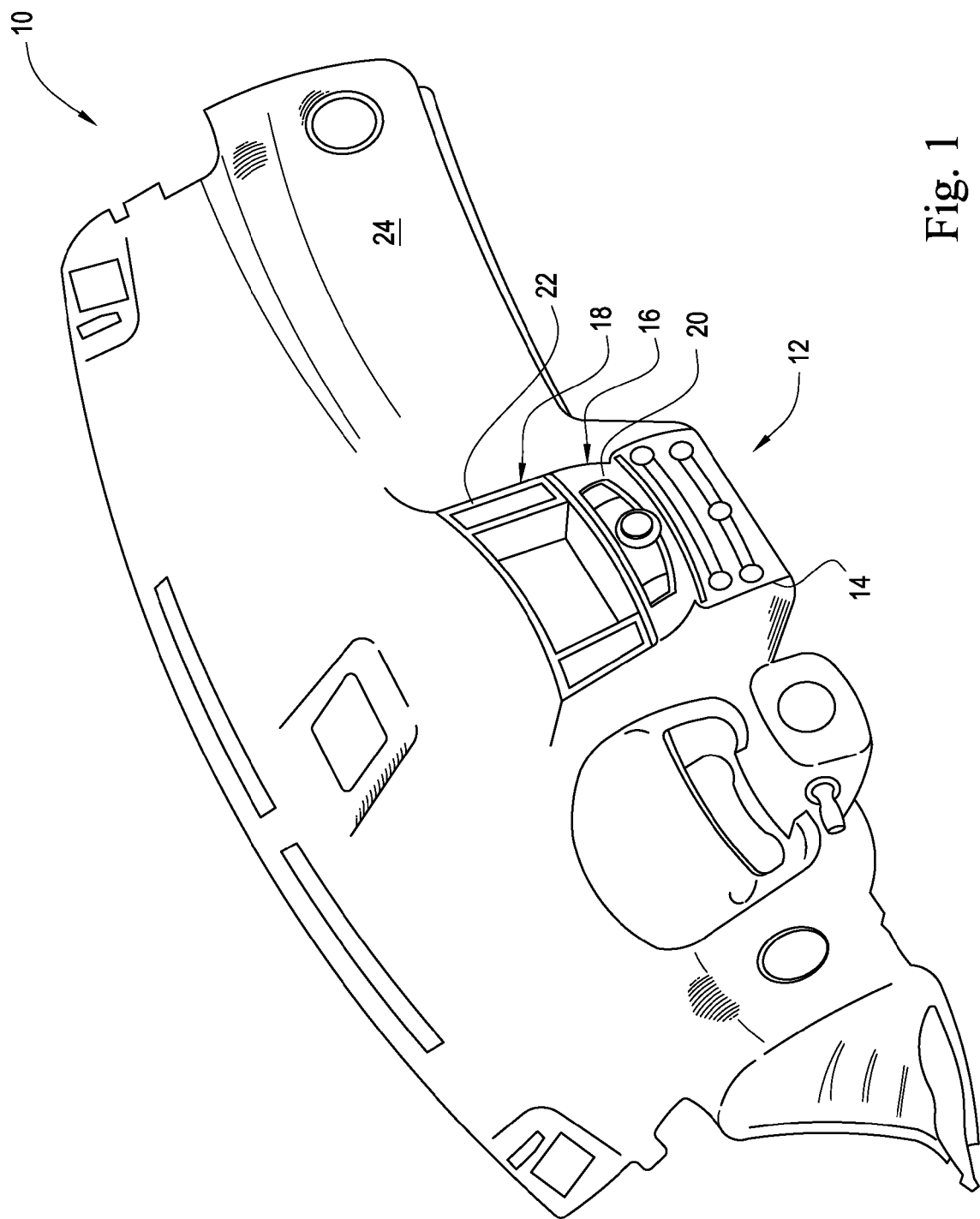
FIG. 1 is a perspective view showing an instrument panel of a vehicle including a center stack having a first panel and a second panel.

FIG. 1 shows an instrument panel 10 of a motor vehicle. The instrument panel 10 includes a center stack 12 that is located within a center stack opening 14, which is defined by the instrument panel 12. The center stack 12 comprises a plurality of panels, including a first panel 16 and a second panel 18 that are connected to one another, as will be described in detail herein.

The first panel 16 has an exterior surface 20. The second panel 18 has an exterior surface 22. When the first panel 16 and the second panel 18 are assembled with respect to the remainder of the instrument panel 10, the exterior surfaces 20, 22 of the first panel 16 and the second panel 18, respectively, form a substantially continuous surface with respect to one another and with respect to an exterior surface 24 of the instrument panel 10.

Figure 2:
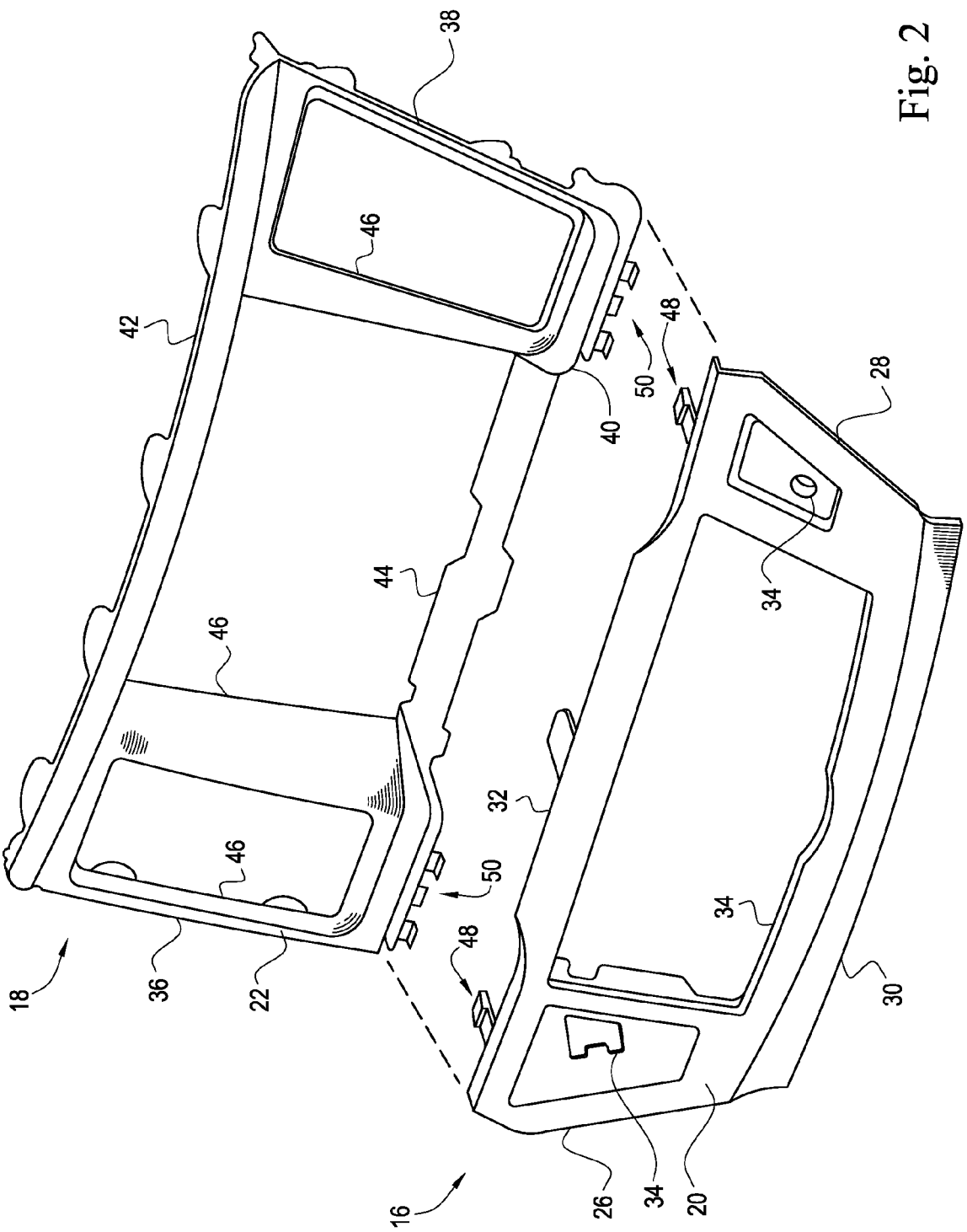
FIG. 2 is an exploded perspective view showing the first panel and the second panel.

As shown in FIG. 2, the first panel 16 has an outer periphery defined by a first side edge 26, a second side edge 28, a lower edge 30, and an upper edge 32. A plurality of openings 34 are defined through the first panel 16.

The second panel 18 has an outer periphery defined by a first side edge 36, a second side edge 38, a lower edge 40, an upper edge 42, and an internal brace 44. The second panel 18 defines a plurality of apertures 46 that extend therethrough.

The first panel 16 and the second panel 18 are shown and described herein to provide context. The connecting structures described herein could, however, be utilized in conjunction with panels that are configured in a variety of different manners. For example, the connecting structures described herein could be used with any pair of adjacent panels having adjacent edges, such as the upper edge 32 of the first panel 16 and the lower edge 40 of the second panel 18.

To connect the first panel 16 to the second panel 18, the first and second panels 16, 18 are provided with complementary pairs of connecting parts such as a first connecting part 48 and a second connecting part 50. The first connecting part 48 can be disposed on the first panel 16, adjacent to the upper edge 32 thereof. The second connecting part 50 can be disposed on the second panel 18 adjacent to the lower edge 40 thereof. However, the second connecting part 50 could be provided on the first panel 16, and the first connecting part 48 could be provided on the second panel 18. The positioning of these components is not limited to the upper edge 32 of the first panel 16 and the lower edge 40 of the second panel 18 but rather that the first connecting part 48 and the second connecting part 50 could be utilized to secure a pair of edges of any two adjacent panels.

Figure 3:
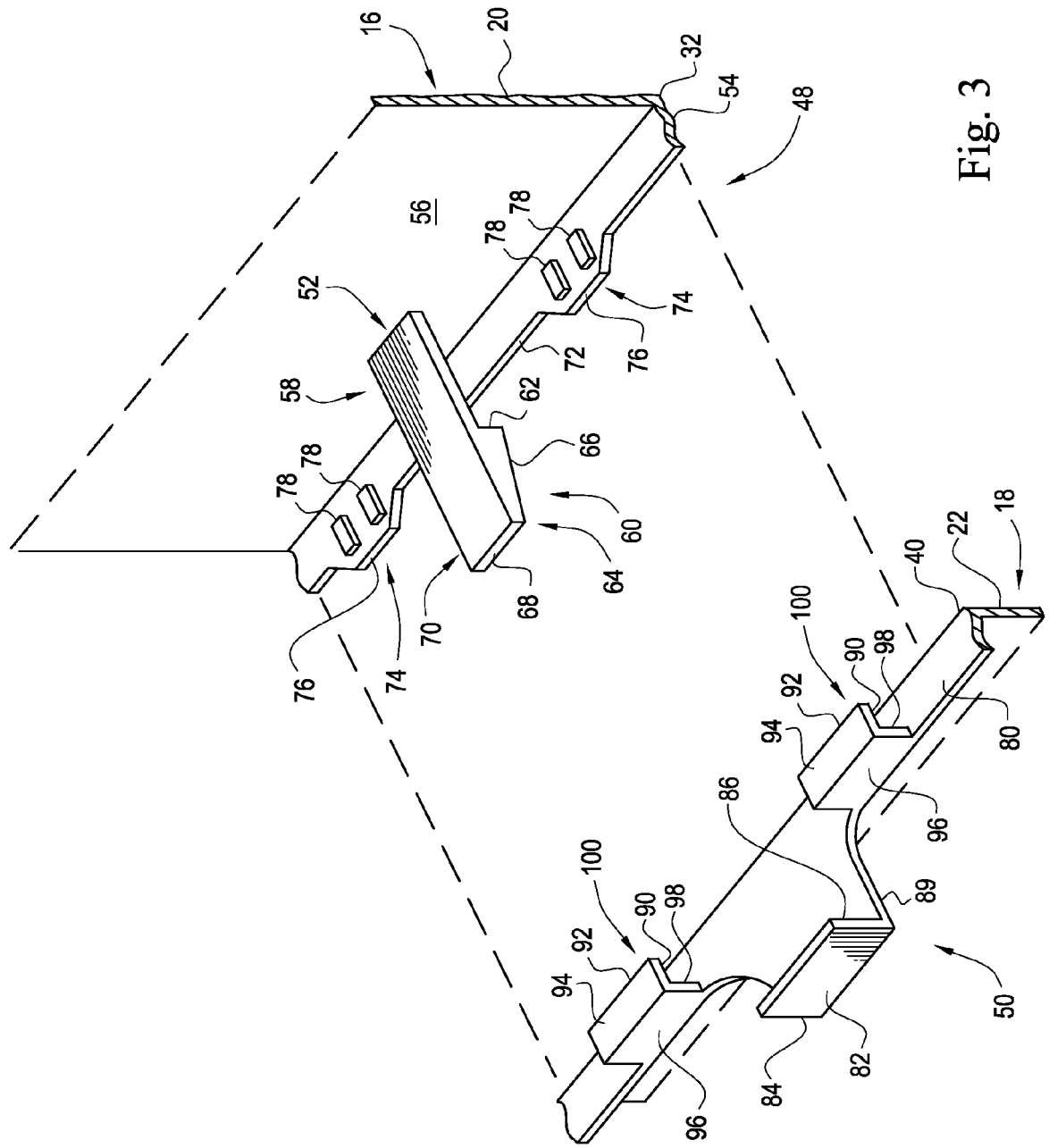
FIG. 3 is a perspective view showing a first connecting part and a second connecting part.
Figure 4:
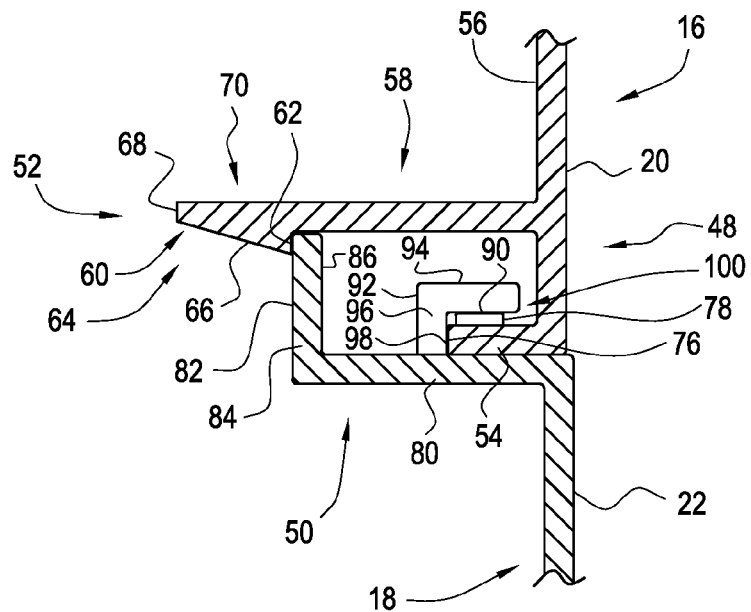
FIG. 4 is a sectional view showing the first connecting part and the second connecting part in an engaged position.
Figure 5:
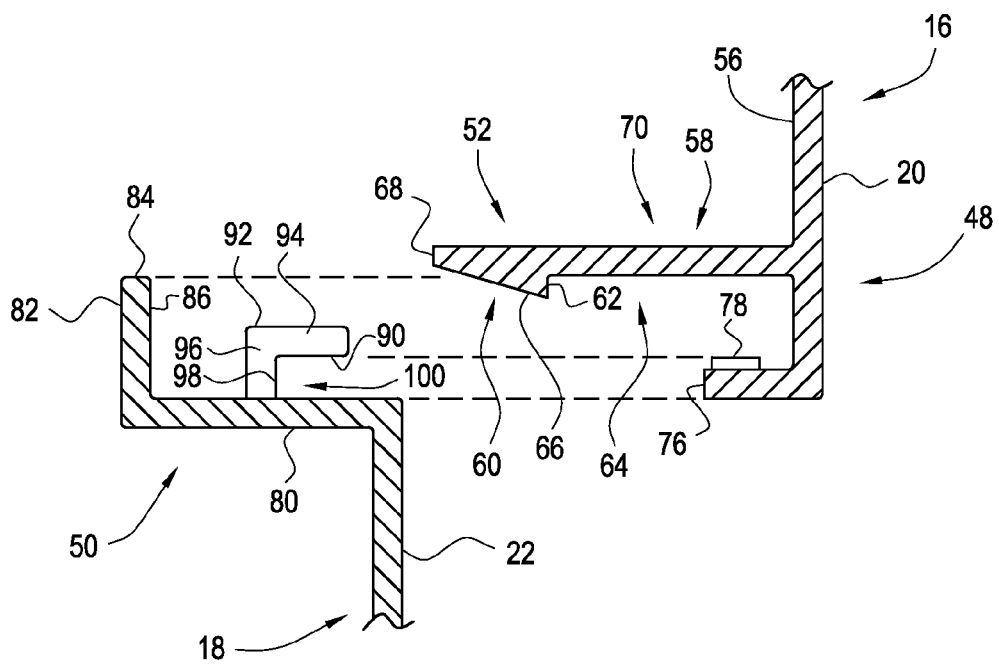
FIG. 5 is a sectional view showing the first connecting part and the second connecting part in a disengaged position.

As shown in FIGS. 3-5, the first connecting part 48 is positioned, for example, adjacent to the upper edge 32 of the first panel 16. It should be noted that for ease of illustration FIG. 3 is oriented as a perspective view looking from the bottom of the center stack 12. As such, the upper edge 32 of the first panel 16, for example, appears toward a lower end of the first panel 16 as illustrated. The first connecting part 48 includes a clip 52 and a stabilizer flange 54 that is spaced apart from the clip 52.

The clip 52 is disposed on an interior surface 56 of the first panel 16 such that the clip 52 extends away from the interior surface 56 of the first panel 16. The clip 52 is spaced apart from the upper edge 32 of the first panel 16 and the stabilizer flange 54 of the first panel 16 in an elevational direction, which is generally perpendicular to the upper edge 32 of the first panel 16.

The clip 52 is a one-sided clip, meaning that it is configured to engage a complementary structure solely on a single side of the clip 52. The clip 52 includes a leg portion that extends outward from the interior surface 56 of the first panel 16 in an insertion direction until it reaches a head portion 60.

The head portion 60 of the clip 52 includes a shoulder 62 and a ramp surface 66, both of which are formed on a first side 64 of the clip 52. The shoulder 62 is formed adjacent to the leg portion 58 and extends in a direction that is generally perpendicular to the direction in which the leg portion 58 extends.

The ramp surface 66 extends from the shoulder 62 toward an outboard end 68 of the clip 52 to allow the clip 52 to deflect away from the stabilizer flange 54 in the elevational direction when the head portion 60 engages the second connecting part 50, as will be explained in detail herein.

A second side 70 of the clip 52 is disposed opposite the first side 64. The second side 70 could be free of structures that are capable of engaging the second connecting part 50. For example, the second side 70 of the clip 52 could be generally flat throughout the leg portion 58 and the head portion 60 of the clip 52.

The stabilizer flange 54 extends inward from the upper edge 32 of the first panel 16 in the insertion direction. The stabilizer flange 54 is generally planar and could, for example, extend in a plane that is generally perpendicular to the elevational direction. An inner edge 72 of the stabilizer flange 54 is disposed opposite the upper edge 32 of the first panel 16 and defines a nominal width for the stabilizer flange 54.

The stabilizer flange 54 may be widened with respect to its normal width in each of one or more engagement areas 74 to define inner engagement surfaces 76 on the inner edge 72 of the stabilizer flange 54. The inner engagement surfaces 76 are widened such that the positional relationship between the exterior surface 20 of the first panel 16 and the exterior surface 22 of the second panel 18 may be adjusted by modifying the width of the inner engagement surfaces 76 within the engagement areas 74, thereby avoiding the need for changing the width of the entirety of the stabilizer flange 54.

Protrusions 78 can be formed on the stabilizer flange 54 in each engagement area 74. Each protrusion 78 extends upward from the stabilizer flange 54 in the elevational direction toward the clip 52. Provision of the protrusions 78 allows the fit between the first connecting part 48 and the second connecting part 50 to be tuned by modifying the height of the protrusions 78, thereby avoiding the need to modify the height of the entirety of the stabilizer flange 54.

The second connecting part 50 is positioned, for example, adjacent to the lower edge 40 of the second panel 18. A base portion of the second connecting part 50 is defined by a base flange 80 that extends inward with respect to the exterior surface 22 of the second panel 18. For example, the base flange 80 may extend in the insertion direction and could define a plane that extends generally perpendicular to the elevational direction, between the lower edge 40 of the second panel 18 and an interior edge 88 of the base flange 80, which defines a nominal width for the base flange 80 in the insertion direction.

The second connecting part 50 has a first engagement structure in the form of an interior facing surface 82 of an upright flange 84. The interior facing surface 82 faces away from the first panel 16 in the insertion direction. The upright flange 84 is positioned on a widened area 89 of the base flange 80.

The interior facing surface 82 of the upright flange 84 is configured to engage the shoulder 62 of the clip 52. While the interior facing surface 82 has been described as a first engagement structure, any structure capable of engaging the shoulder 62 of the clip 52 could be used as the first engagement structure.

The upright flange 84 also has an exterior facing surface 86 that faces toward the first panel 16 in the insertion direction. The upright flange 84 extends in the elevational direction with respect to the base flange 80 and could, for example, extend substantially perpendicular to the base flange 80. The upright flange 84 is spaced from the exterior surface 22 of the second panel 18 by a distance that is complementary to the distance between the exterior surface 20 and the shoulder 62 of the clip 58 of the first panel 16, such that the exterior surfaces 20, 22 of the first panel 16 and the second panel 18, respectively, may be brought into a substantially coplanar relationship when connected to one another.

During connection of the first panel 16 to the second panel 18, the ramp surface 66 of the clip 58 of the first connecting part 48 is engageable with the exterior facing surface 86 of the upright flange 84 of the second connecting part 50. Engagement of the ramp surface 66 with the exterior facing surface 86 deflects the head portion 60 of the clip 52 away from the base flange 80 of the second connecting part 50 and also away from the stabilizer flange 54 of the first connecting part 48. This allows the head portion 60 of the clip 52 to move past the upright flange 84. The upright flange 84 could also deflect away from the clip 52 in order to avoid localizing the entirety of the deflecting motion to a single component.

The second connecting part 50 has a second engagement structure in the form of a first internal surface 90 of a channel-forming member 92. The first internal surface 90 of the channel-forming member 92 faces the base flange 80 and is spaced apart from the base flange 80 in the elevational direction.

The first internal surface 90 of the channel-forming member 92 could be disposed, for example, on an outwardly-extending flange 94 of the channel-forming member 92. The outwardly-extending flange 94 of the channel-forming member 92 is positioned in a spaced relationship with respect to the base flange 80 by an upwardly-extending flange 96, which is also a portion of the channel-forming member 92. The base flange 80, the upwardly-extending flange 96, and the outwardly-extending flange 94 cooperate to define a channel 100 that is configured to receive the stabilizer flange 54 of the first connecting part 80.

A second internal surface 98 of the channel-forming member 92 may be disposed on the upwardly-extending flange 96 of the channel-forming member 92. More particularly, one of the engagement areas 74 of the stabilizer flange 54 may be received within a complementary one of the channel-forming members 92 such that the stabilizer flange 54 is in contact with the base flange 80, the inner engagement surface 76 of the engagement area 74 is in contact with the second internal surface 98 of the channel-forming member 92, and one or more of the protrusions 78 is in contact with the first internal surface 90 of the channel-forming member 92.

Multiple channel-forming members 92 can be provided. As shown in the figures, for example, the channel-forming members 92 could be disposed in pairs, such that one of the channel-forming members 92 is disposed on each side of the upright flange 84. In this manner, the channel-forming members 92 are spaced from the upright flange 84 and the clip 52 in a lateral direction, which could be defined as substantially perpendicular to both the elevational direction and the insertion direction.

The first panel 16 and the second panel 18 are moveable with respect to one another between an engaged position and a disengaged position. In the engaged position, the clip 52 of the first connecting part 48 is in engagement with the upright flange 84 of the second connecting part 50. Furthermore, the interior-facing surface 82 of the upright flange 84 contacts the shoulder 62 of the clip 52 in order to restrain movement of the first connecting part 48 with respect to the second connecting part 50 toward the disengaged position in a direction opposite of the insertion direction.

The clip 52 could be configured, as illustrated in the figures, such that the clip 52 has no capacity to restrain movement of the first panel 16 away from the second panel 18 in the elevational direction. That is to say that the clip 52 is configured to restrain movement of the first connecting part 48 with respect to the second connecting part 50 from the engaged position toward the disengaged position solely along an axis that is parallel to the insertion direction. Thus, although the shoulder 62 on the first side 64 of the clip 52 is engageable with the interior-facing surface 82 of the upright flange 84 of the second connecting part 50, the second connecting part 50 is disposed entirely on the first side 64 of the clip 52 when the first connecting part 48 and the second connecting part 50 are in the engaged position. Thus, the second side 70 of the clip 52 faces away from the second connecting part 50 when the first connecting part 48 and the second connecting part 50 are in the engaged position.

The first internal surface 90 of the channel-forming member 92 is engageable with the stabilizer flange 54 in order to restrain movement of the first connecting part 48 with respect to the second connecting part 50 in the elevational direction when the first connecting part 48 and the second connecting part 50 are in the engaged position to prevent unintentional movement toward the disengaged position. For instance, the first internal surface 90 of the channel-forming member 92 could be interposed between the stabilizer flange 54 and the clip 52 of the first connecting part 48 such that the first internal surface 90 of the channel-forming member 92 is both in contact with the stabilizer flange 54 and spaced apart from the clip 52. Also, although engagement directly with the stabilizer flange 54 is contemplated, this is not required, as even engagement with portions of the stabilizer flange 54 such as the protrusions 78 can effectively prevent unintentional movement of the stabilizer flange 54 toward the disengaged position.

Since the first connecting part 48 is fixed to the first panel 16 and the second connecting part 50 is fixed to the second panel 18, the first connecting part 48 and the second connecting part 50 are spaced apart from one another in the disengaged position. In order to move the first connecting part 48 and the second connecting part 50 toward the engaged position, the first panel 16 is moved toward the second panel 18 in the insertion direction in a manner such that the first connecting part 48 is aligned with the second connecting part 50. As the ramp surface 66 of the head portion 60 of the clip 52 engages the upright flange 84 of the second connecting part 50, the clip 52 deflects away from the stabilizer flange 54 of the first connecting part 48 in the elevational direction and continues to do so until the head portion 60 of the clip 52 passes the upright flange 84. At that point, the clip 52 is biased back toward its normal position, which places the shoulder 62 of the head portion 60 of the clip 52 directly adjacent to the outwardly facing surface 82 of the upright flange 84 of the second connecting part 50.

As the head portion 60 of the clip 52 moves past the upright flange 84, the stabilizer flange 54 of the first connecting part 48 enters the channels 100 of the second connecting part 50. This brings the stabilizer flange 54, including the protrusions 78 and the inner engagement surfaces 76 into engagement with the channel-forming members 92. This could include engagement of the protrusions 78 or other portions of the stabilizer flange 54 with the first internal surface 90 of the channel-forming member 92, as well as engagement of the inner engagement surfaces 76 or other portions of the stabilizer flange 54 with the second internal surface 98 of the channel-forming member 92.

Movement of the first panel 16 and the second panel 18 from the engaged position to the disengaged position is accomplished by disengaging the shoulder 62 of the clip 52 with respect to the interior-facing surface 82 of the upright flange 84. For example, the clip 52 could be deflected in the elevational direction and/or the upright flange 84 could be deflected in the direction opposite of the elevational direction such that they move away from one another until the shoulder 62 of the clip 52 is no longer restrained by the interior-facing surface 82 of the upright flange 84.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A panel structure for an automobile, comprising:
   a first panel having a first edge;
   a first connecting part positioned adjacent to the first edge of the first panel, the first connecting part having a clip and a stabilizer flange that is spaced apart from the clip, wherein the stabilizer flange includes a first portion and a second portion that are situated on opposite sides of the clip in a lateral direction that is substantially perpendicular to both an insertion direction and an elevational direction;
   a second panel having a second edge; and a second connecting part positioned adjacent to the second edge of the second panel, the second connecting part having a first engagement structure that is engageable with the clip of the first connecting part to restrain movement of the second panel with respect to the first panel in the insertion direction, and a second engagement structure that is engageable with the first portion of the stabilizer flange and the second portion of the stabilizer flange of the first connecting part to restrain movement of the second panel with respect to the first panel in the elevational direction, wherein each of the first portion of the stabilizer flange and the second portion of the stabilizer flange includes an extension portion and a plurality of discrete protrusions, each protrusion from the plurality of discrete protrusions extending upward from the extension portion in the elevational direction, each protrusion from the plurality of discrete protrusions directly contacting the second engagement structure, and the protrusions from the plurality of discrete protrusions being spaced apart with respect to one another in the lateral direction that is substantially perpendicular to both the insertion direction and the elevational direction, and wherein the second connecting part includes a base portion and the first engagement structure extends outward from the base portion in a direction opposite of the elevational direction, a portion of the second engagement structure of the second connecting part is interposed between the stabilizer flange and the clip of the first connecting part such that the second engagement structure contacts the stabilizer flange and is spaced apart from the clip, and the portion of the second engagement structure of the second connecting part is spaced apart from the base portion to define a channel within which the stabilizer flange of the first connecting part is receivable.

2. A panel structure for an automobile, comprising:

a first panel having a first edge;

a first connecting part positioned adjacent to the first edge of the first panel, the first connecting part having a clip and a stabilizer flange that is spaced apart from the clip, wherein the stabilizer flange includes a first portion and a second portion that are situated on opposite sides of the clip in a lateral direction that is substantially perpendicular to both an insertion direction and an elevational direction;

a second panel having a second edge; and a second connecting part positioned adjacent to the second edge of the second panel, the second connecting part having a first engagement structure that is engageable with the clip of the first connecting part to restrain movement of the second panel with respect to the first panel in the insertion direction, and a second engagement structure that is engageable with the first portion of the stabilizer flange and the second portion of the stabilizer flange of the first connecting part to restrain movement of the second panel with respect to the first panel in the elevational direction, wherein each of the first portion of the stabilizer flange and the second portion of the stabilizer flange includes an extension portion and a plurality of discrete protrusions, each protrusion from the plurality of discrete protrusions extending upward from the extension portion in the elevational direction, each protrusion from the plurality of discrete protrusions directly contacting the second engagement structure, and the protrusions from the plurality of discrete protrusions being spaced apart with respect to one another in the lateral direction that is substantially perpendicular to both the insertion direction and the elevational direction, and wherein the clip of the first connecting part includes a shoulder that is formed on a first side of the clip for engagement with the first engagement structure of the second connecting part, wherein the second connecting part is disposed entirely on the first side of the clip, such that a second side of the clip that is opposite the first side of the clip faces away from the second connecting part.

3. The panel structure of claim 2, wherein the elevational direction is substantially perpendicular to the insertion direction, the first panel and the second panel are moveable with respect to one another between an engaged position and a disengaged position, engagement of the first engagement structure with the clip restrains movement of the first panel with respect to the second panel toward the disengaged position in a direction opposite of the insertion direction, engagement of the second engagement structure with the stabilizer flange restrains movement of the first panel with respect to the second panel in a direction opposite of the elevational direction, and the clip is configured to restrain movement of the first panel with respect to the second panel from the engaged position toward the disengaged position solely along an axis that is parallel to the insertion direction.

4. The panel structure of claim 2, wherein the first connecting part includes a base portion, the clip extends outward from the base portion in the insertion direction, the stabilizer flange extends outward form the base portion in the insertion direction, the second engagement structure is spaced apart from the first engagement structure in the lateral direction, and the stabilizer flange is spaced apart from the clip in the elevational direction.

5. The panel structure of claim 2, wherein the second connecting part includes a base portion and the first engagement structure extends outward from the base portion in a direction opposite of the elevational direction, a portion of the second engagement structure of the second connecting part is interposed between the stabilizer flange and the clip of the first connecting part such that the second engagement structure contacts the stabilizer flange and is spaced apart from the clip, and the portion of the second engagement structure of the second connecting part is spaced apart from the base portion to define a channel within which the stabilizer flange of the first is receivable.

6. The panel structure of claim 2, wherein the clip is a one-sided clip.

7. A connecting structure, comprising:

a first connecting part having a clip and a stabilizer flange that is spaced apart from the clip; and a second connecting part having a first engagement structure that is engageable with the clip of the first connecting part to restrain movement of the second connecting part with respect to the first connecting part in an insertion direction, and a second engagement structure that is engageable with the stabilizer flange of the first connecting part to restrain movement of the second connecting part with respect to the first connecting part in an elevational direction, wherein the stabilizer flange includes an extension portion and a plurality of discrete protrusions, each protrusion from the plurality of discrete protrusions extending upward from the extension portion in the elevational direction, each protrusion from the plurality of discrete protrusions directly contacting the second engagement structure, and the protrusions from the plurality of discrete protrusions being spaced apart with respect to one another in a lateral direction that is substantially perpendicular to both the insertion direction and the elevational direction, and wherein the second engagement structure defines a channel that is configured to receive the stabilizer flange such that the second engagement structure is engageable with the plurality of discrete protrusions of the stabilizer flange and the second engagement structure is further engageable with a surface of the stabilizer flange that is opposite the plurality of protrusions in the elevational direction to restrain elevational movement of the first connecting part with respect to the second connecting part.

8. The connecting structure of claim 7, wherein the elevational direction is substantially perpendicular to the insertion direction.

9. The connecting structure of claim 7, wherein the first connecting part includes a base portion, the clip extends outward from the base portion in the insertion direction, and the stabilizer flange extends outward form the base portion in the insertion direction.

10. The connecting structure of claim 7, wherein the second engagement structure of the second connecting part is spaced apart from the first engagement structure of the second connecting part in the lateral direction.

11. The connecting structure of claim 7, wherein the stabilizer flange is spaced from the clip in the elevational direction.

12. The connecting structure of claim 7, wherein a portion the second engagement structure of the second connecting part is interposed between the stabilizer flange and the clip of the first connecting part such that the second engagement structure contacts the stabilizer flange and is spaced apart from the clip.

13. The connecting structure of claim 7, wherein the clip is a one-sided clip.

14. The connecting structure of claim 7, wherein the second connecting part includes a base portion and the first engagement structure extends outward from the base portion in a direction opposite of the elevational direction.

15. The connecting structure of claim 14, wherein a portion of the second engagement structure of the second connecting part is spaced apart from the base portion to define the channel in which the stabilizer flange of the first connecting part is receivable.

16. The connecting structure of claim 7, wherein the first connecting part and the second connecting part are moveable with respect to one another between an engaged position and a disengaged position.

17. The connecting structure of claim 16, wherein engagement of the first engagement structure of the second connecting part with the clip restrains movement of the first connecting part with respect to the second connecting part toward the disengaged position in a direction opposite of the insertion direction.

18. The connecting structure of claim 16, wherein the clip is configured to restrain movement of the first connecting part with respect to the second connecting part from the engaged position toward the disengaged position solely along an axis that is parallel to the insertion direction.

\* \* \* \* \*